(12) United States Patent
Kubota

(10) Patent No.: US 7,971,477 B2
(45) Date of Patent: Jul. 5, 2011

(54) DETECTION METHOD FOR FORCES ACTING ON TIRE AND PNEUMATIC TIRE USED THEREIN

(75) Inventor: Yasuhiro Kubota, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/674,306

(22) PCT Filed: Aug. 5, 2008

(86) PCT No.: PCT/JP2008/064029
§ 371 (c)(1),
(2), (4) Date: Feb. 19, 2010

(87) PCT Pub. No.: WO2009/025172
PCT Pub. Date: Feb. 26, 2009

(65) Prior Publication Data
US 2010/0281968 A1 Nov. 11, 2010

(30) Foreign Application Priority Data
Aug. 21, 2007 (JP) .................................. 2007-214949

(51) Int. Cl.
*B60C 23/02* (2006.01)
(52) U.S. Cl. .......................................... 73/146.5
(58) Field of Classification Search ................ None
See application file for complete search history.

(56) References Cited

U.S. PATENT DOCUMENTS

| 7,506,539 B2* | 3/2009 | Miyoshi et al. ................. 73/146 |
| 2005/0103100 A1* | 5/2005 | Miyoshi et al. ................. 73/146 |
| 2008/0245459 A1* | 10/2008 | Miyoshi ........................ 152/450 |
| 2008/0294352 A1* | 11/2008 | Spetler ............................ 702/33 |
| 2008/0300801 A1* | 12/2008 | Miyoshi .......................... 702/42 |

FOREIGN PATENT DOCUMENTS

| JP | 2004-331009 A | 11/2004 |
| JP | 2005-41271 A | 2/2005 |
| JP | 2005-126008 A | 5/2005 |
| JP | 2006-27403 A | 2/2006 |
| JP | 2006-64565 A | 3/2006 |
| JP | 2008-114798 A | 5/2008 |
| JP | 2008-256607 A | 10/2008 |

* cited by examiner

*Primary Examiner* — Andre J Allen
(74) *Attorney, Agent, or Firm* — Birch, Stewart, Kolasch & Birch, LLP

(57) ABSTRACT

A detection method for at least one of acting forces on tire among a back-and-forth directional force, a lateral force, vertical force, and a moment about a tire axis, detects the forces by strain outputs of strain sensors, which are attached on the tire and measure the strains of a sidewall portion. The method includes a strain measuring step to measure the strain of the sidewall portion with each of the above-mentioned strain sensors simultaneously at the rotational position P based on the tire rotational standard position X and to obtain the strain output per each strain sensor, and an acting force calculating step to calculate the above-mentioned force acting on the tire based on the strain output per strain sensor obtained on this strain measuring step.

7 Claims, 9 Drawing Sheets

DETECTION METHOD FOR FORCES ACTING ON TIRE AND PNEUMATIC TIRE USED THEREIN

TECHNICAL FIELD

The present invention relates to a detection method for at least one of forces acting on a tire such as back-and-forth direction force, lateral force, vertical force, and moment about tire axis and a pneumatic tire used therein by measuring with a strain sensor in a sidewall portion.

BACKGROUND OF THE INVENTION

In recent years, the number of vehicles equipped with vehicle control systems such as ABS (anti-lock brake system), TCS (traction control system), VSC (vehicle stability control system), and the like are rising to obtain the stability and safety of moving vehicles. In order to control these systems, it is necessarily to understand accurately the rolling situation of moving vehicle.

Then, the present applicants propose, in a Patent document 1, a technique to estimate back-and-forth direction force Fx, lateral force Fy, vertical force Fz acting on a tire by arranging plural of strain sensors on a side wall portion of the tire and estimating the strain of the sidewall portion.

Patent document 1: Japanese Unexamined Patent Application Publication No. 2005-126008.

In this technique, strains of three fixed points on the sidewall portion area measured at the same time with the strain sensors. And, calculate the back-and-forth direction force Fx, lateral force Fy, vertical force Fz basing on the three strain outputs t1, t2, and t3 according to the following determinant (1). The A1 to A3, B1 to B3, and C1 to C3 in the determinant are coefficients determined by means of tire loading test conducted beforehand.

$$\begin{bmatrix} Fx \\ Fy \\ Fz \end{bmatrix} = \begin{bmatrix} A1 & B1 & C1 \\ A2 & B2 & C2 \\ A3 & B3 & C3 \end{bmatrix}^{-1} \begin{bmatrix} t1 \\ t2 \\ t3 \end{bmatrix} \quad (1)$$

However, when actually conducting a vehicle controlling such as ABS brake controlling for example, to speed up responsivity and conduct high performance vehicle controlling, obtaining information of force acting on the tire 8 times per one revolution, that is to say, each rolling angle of not less than 45 deg.

DISCLOSURE OF THE INVENTION

Problems to be Solved by the Invention

However, in the above-mentioned technique, the above determinant (1) needs to be set per rolling angle of tire (rolling position of tire) at the time of measuring the strain of a sidewall portion. Therefore, when conducting a vehicle controlling with the above-mentioned technique, it is necessary to memory many determinants (1) and to calculate acting force of the tire at each rolling position at the time of measuring the strain of the sidewall portion with using the determinants (1) depending on the tire rolling position and the like, and there is a problem to bring an enormous rise in calculation and to need a micro processing unit having a high-performance in operation throughput.

In view of those facts, the inventor of the present application studied. The tread portion reinforced by high rigidity belt layers at the trim of a radial tire deforming acts as a rigidity ring body; therefore, the sidewall portion deforms in not only a ground contacting side but across the entire the tire circumference. For example, as shown in FIGS. 9 (A) to (D), when the force acting on tire occurring, distortional deformation of the rigidity ring body (a) occurs in the sidewall portion across the entire the tire circumference due to a moment My about the tire axis, a lateral force Fy, a back-and-forth directional force Fx, and a vertical force Fz. This strain of the sidewall portion has a direction in accordance with the above-mentioned force acting on tire. Hence, the inventor found that devising way of the direction of strain of the above-mentioned strain sensors and the arrangement of the strain sensors was possible to remain only the certain strain of the sidewall portion and balance other strains of the sidewall portion out, and detect only the force acting on tire with separating from other force acting on tires, when it could help to simplify the calculation of force acting on tire and to reduce amount of calculation and the load on the arithmetic processing of the microprocessor.

It is an object of the present invention to provide a detection method for forces acting on tire and a pneumatic tire therein, which can detect only the force acting on tire with separating from other acting forces on tire basing on controlling the direction of maximum gain lines in strain sensors and the arrangement of strain sensors, and moreover, can simplify the calculation of force acting on tire and reduce amount of calculation and the load on the arithmetic processing of the microprocessor reduce amount of calculation.

Means for Solving the Problem

The invention of claim 1 of the present application is a detection method for at least one of acting forces on tire among a back-and-forth directional force, a lateral force, a vertical force, and a moment about a tire axis acting on a tire by the strain outputs of strain sensors, which are attached on the tire and measure the strains of a sidewall portion, characterized in that said strain sensors comprise:
first strain sensors that have the gain maximum line, in which the gain thereof becomes max, inclining to one side of the circumferential direction of the tire at an angle of 45 deg. with respect to the tire radial direction line, and
second strain sensors that have the gain maximum line inclining to the other side of the circumferential direction of the tire at an angle of 45 deg. with respect to the tire radial direction line; and
at least four pairs of sensors, in which one of said first strain sensors and one of said second strain sensors are made a pair, arranged at regular intervals on the circumference line of one circle around the axis of the tire in the region of the sidewall portion of tire; and wherein the method comprises:
a strain measuring step to measure the strain of the sidewall portion with each of said strain sensors simultaneously at the rotational position P based on the tire rotational standard position X and to obtain the strain output per each strain sensor, and
an acting force calculating step to calculate said force acting on tire based on the strain output per strain sensor obtained on this strain measuring step.

The invention of claim 7 of the present application is a detection method for at least one of acting forces on tire among the back-and-forth directional force, the vertical force, and the moment about a tire axis acting on a tire by the strain outputs of strain sensors, which are attached on the tire and measure the strains of a sidewall portion,
characterized in that
said strain sensors comprise
  only a number of first strain sensors that have the gain maximum line, in which the gain thereof becomes max, inclining to one side of the circumferential direction of the tire at an angle of 45 deg. with respect to the tire radial direction line, and
  at least four and an even number of sensors, in which one of said first strain sensors and one of said second strain sensor are made a pair are arranged at regular intervals on the circumference line of one circle around the axis of the tire in the region of the sidewall portion of tire; and
the method comprises:
  a strain measuring step to measure the strain of the sidewall portion with each of said strain sensors simultaneously at the rotational position P based on the tire rotational standard position X and to obtain the strain output per each strain sensor, and
  an acting force calculating step to calculate said force acting on tire based on the strain output per strain sensor obtained on this strain measuring step.

Effect of the Invention

As explained after-mentioned "Best mode for carrying out the invention", the above-mentioned composition is possible to remain only the certain strain of the sidewall portion and balance other strains of the sidewall portion out, and detect only the force acting on tire with separating from other force acting on tires, when it can help to simplify the calculation of force acting on tire and to reduce amount of calculation and the load on the arithmetic processing of the microprocessor.

EXPLANATION OF THE REFERENCE MARK

10 Strain sensor
10a First strain sensor
10b Second strain sensor
15 Paired sensors
Fx Back-and-forth directional force
Fy Lateral force
Fz vertical force
My Moment about a tire axis
N Gain maximum line
S1 Strain measuring step
S2 Acting force calculating step
t Strain output
Y Region of sidewall portion

BEST MODE FOR CARRYING OUT THE INVENTION

Figure 1:
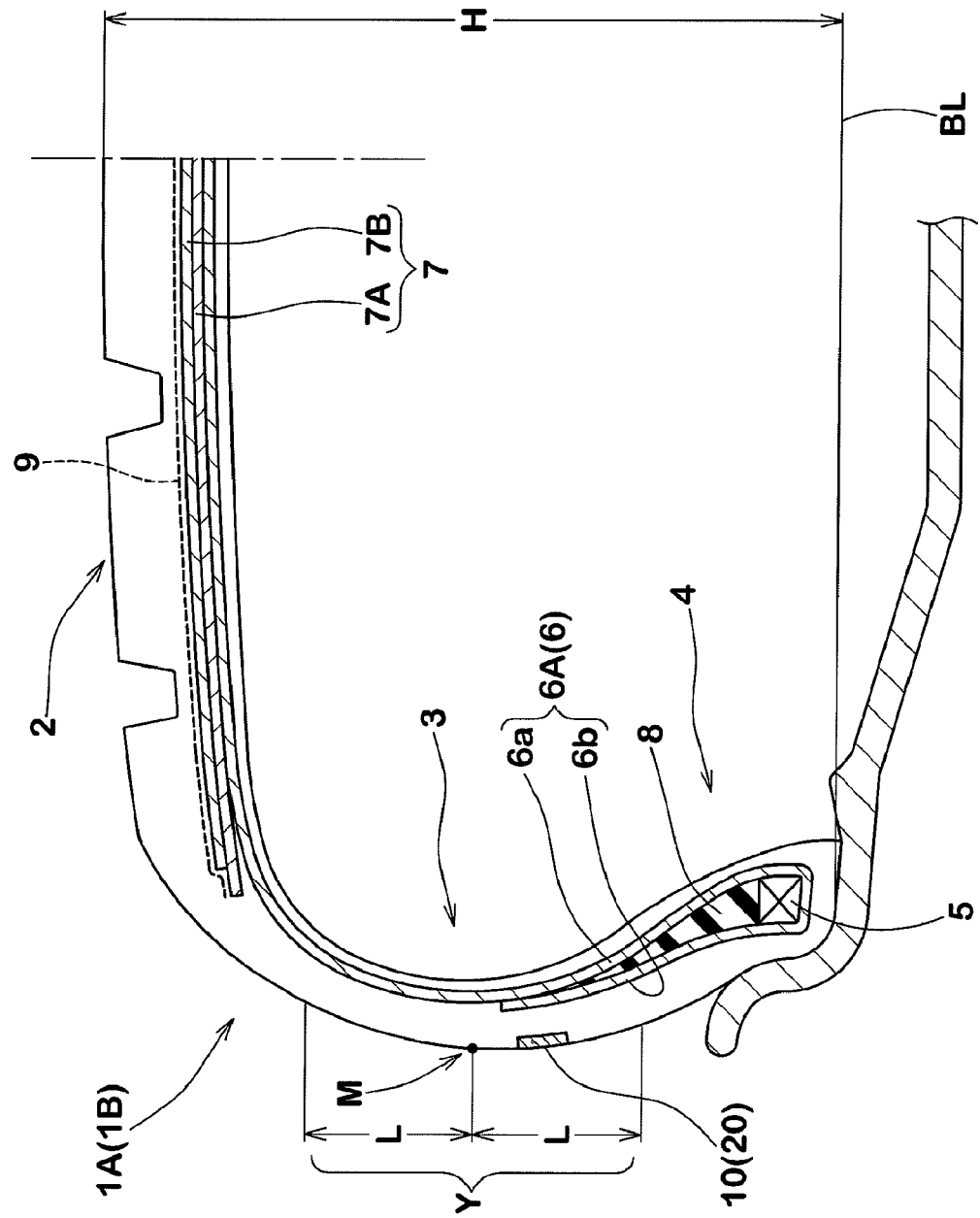
FIG. 1 is a cross sectional view of a pneumatic tire used in the detection method for forces acting on tire according to the present invention.

Hereinafter, an embodiment of the present invention will now be described on the basis of drawings. FIG. 1 shows a cross sectional view of a pneumatic tire 1A used in the detection method for forces acting on tire according to the first invention or a cross sectional view of a pneumatic tire 1B used in the detection method for forces acting on tire according to the second invention.

Each of the pneumatic tires 1A and 1B used in the method of the first invention and the second invention, as shown in FIG. 1, comprises a carcass 6 extending from a tread portion to bead cores 5 of bead portions 4 through sidewall portions 3 and belt layers 7 disposed inside the tread portion 2 and outside the above-mentioned carcass 6 in the radial direction.

The above-mentioned carcass 6 comprises one or more carcass plies 6A, one carcass ply in this example, in which carcass cords are arranged at an angle of 70 to 90 deg., for example, with respect to the circumferential direction of the tire. This carcass ply 6A comprises ply turnup parts 6b turned up around the above-mentioned bead cores 5 from the inside to the outside in the of axial direction of the tire continuously on both sides of a ply main part 6a between the bead cores 5.5. Between the above-mentioned ply main part 6a and the ply turn up part 6b, there is a bead apex rubber 8 extending from the above-mentioned bead core 5 toward radially outwardly and having a cross sectional shape of triangular for reinforcing the bead.

The above-mentioned belt layer 7 comprises two or more belt plies, two belt plies 7A, 7B in this example, having belt cords arranged at an angle of 70 to 90 deg. with respect to the circumferential direction of the tire. The belt plies are stacked so that the belt cords in one ply intersects with those in another belt ply to thereby enhance the belt rigidity so as to firmly reinforce the substantially overall width of the tread portion 2 with hoop effect. Radially outside the belt layer 7, there is a band layer 9 having belt cords arranged at an angle of not more than 5 deg. with respect to the circumferential direction to improve high speed running performance and high speed durability.

The above-mentioned sidewall portion 3 is provided with a number of strain sensors 10 in a region Y. The above-mentioned region Y of the sidewall portion 3 is an area centering on the intermediate height position M of a tire cross-sectional height H and extending radially inwardly and outwardly by a distance L of 30% of the tire cross-sectional height H. It is preferable to set the above-mentioned distance L to 25% of the tire cross-sectional height H, more preferably 20%, and then, to provide the above-mentioned strain sensors 10 in an area closer to the intermediate height position M. The above-mentioned tire cross-sectional height H is a radial height from a bead base line BL to a tread surface on the tire equator.

Figure 2A:
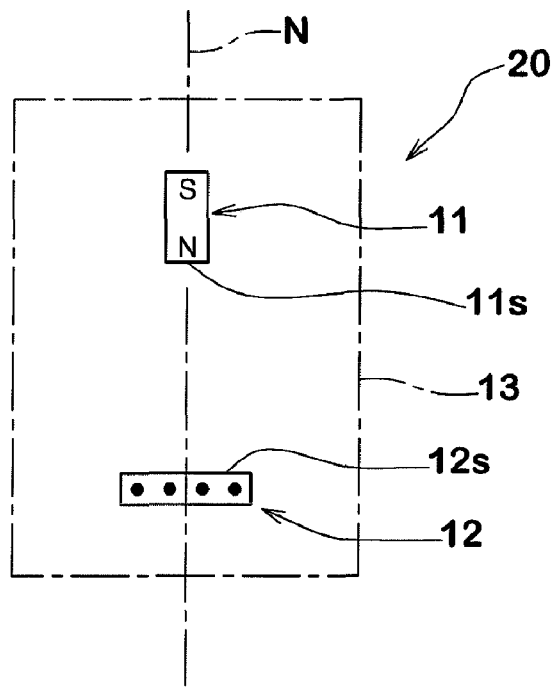
FIGS. 2 (A) and (B) are a plan view and a perspective view of an embodiment of a sensor element unit.
Figure 2B:
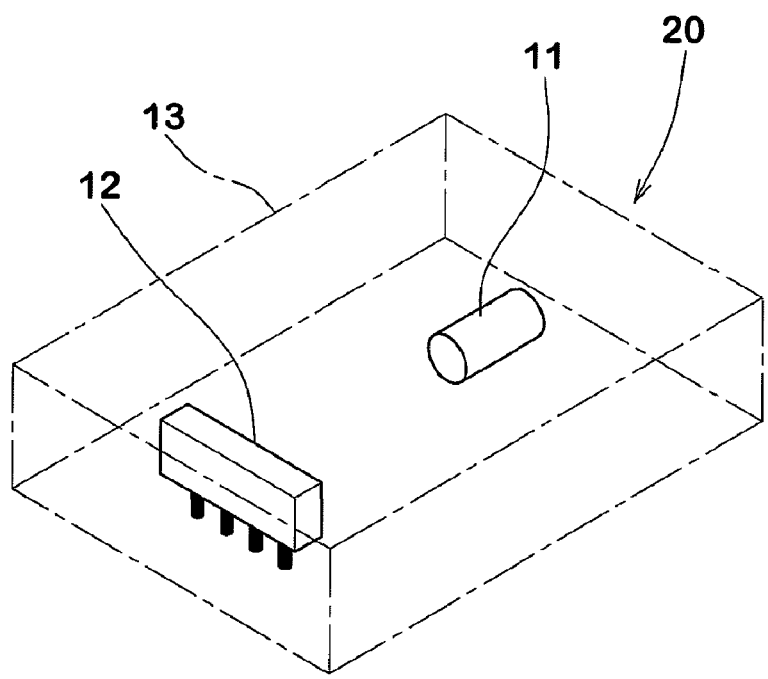
Figure 3A:
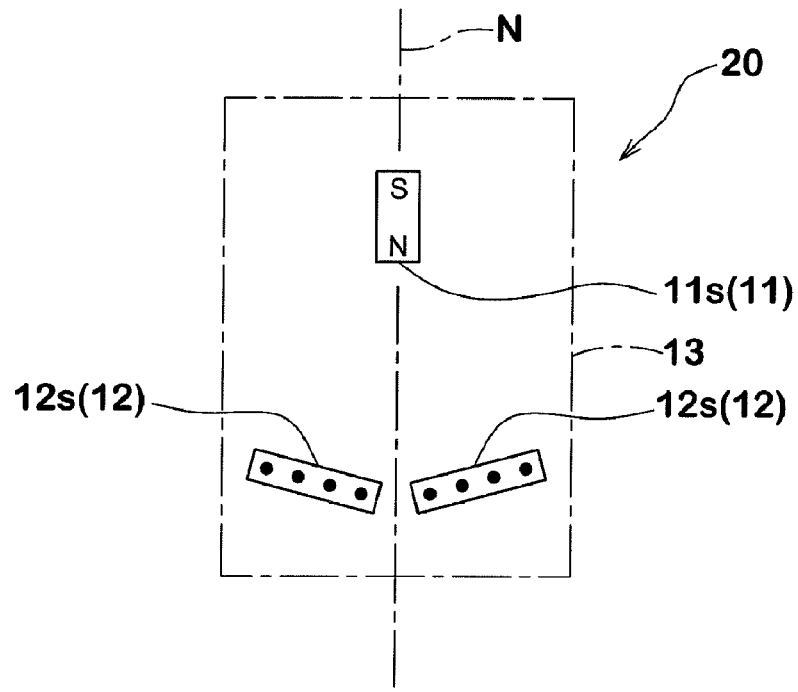
FIGS. 3 (A) and (B) are a plan view and a perspective view of another embodiment of the sensor element unit.
Figure 3B:
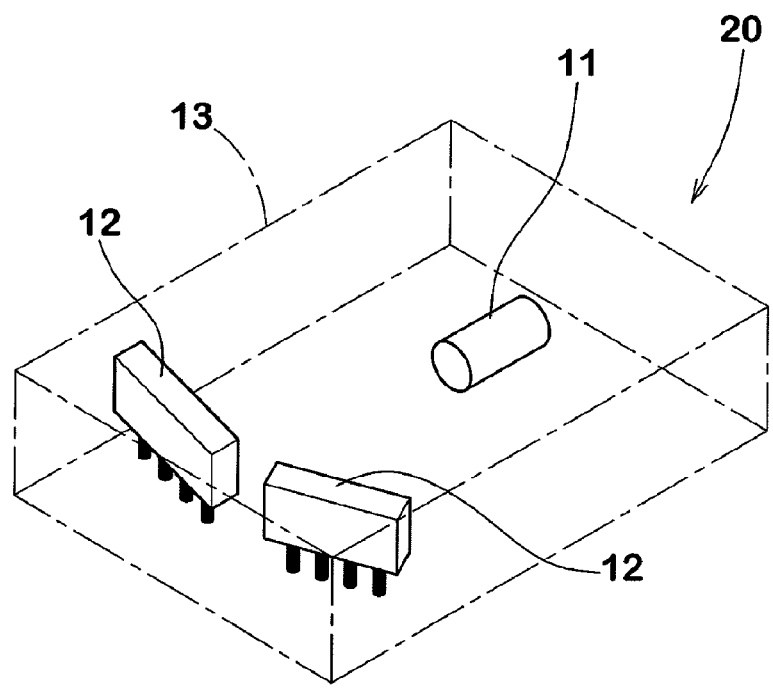
Figure 4A:
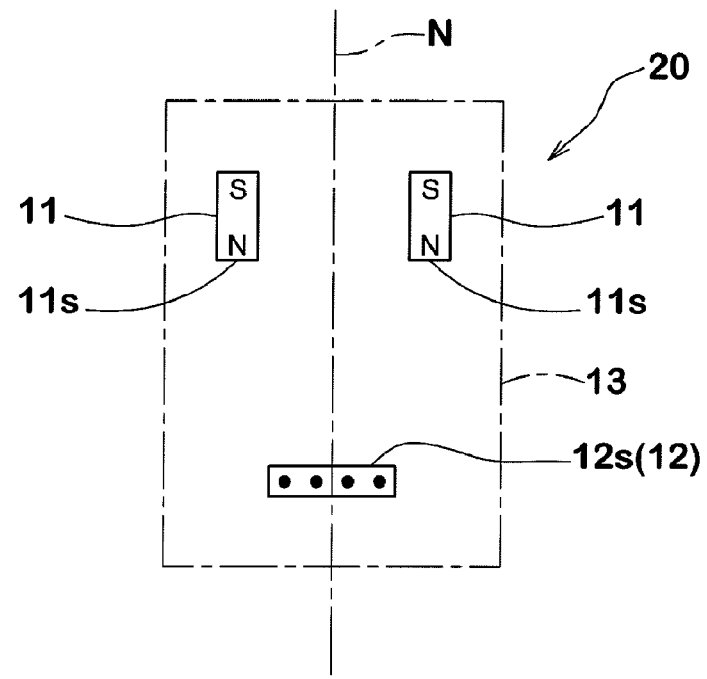
FIGS. 4 (A) and (B) are a plan view and a perspective view of yet another embodiment of the sensor element unit.
Figure 4B:
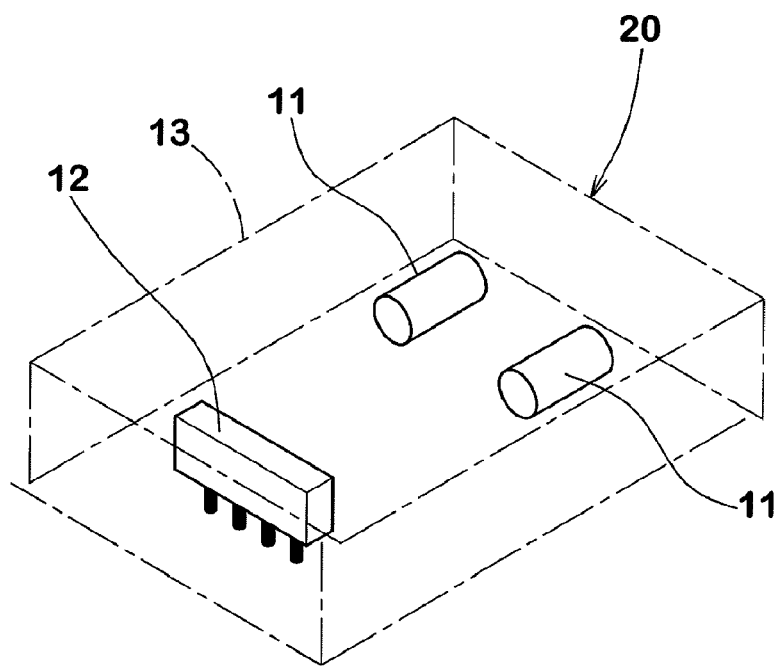

For the above-mentioned strain sensor 10, preferably used is a blockish sensor element unit 20 comprises a magnet 11 and an magnetometric sensor element 12 facing this magnet 11 while defining a space with the magnet 11 integrally through the a elastic material 13 as shown in FIGS. 2 to 4. For the magnetic sensor unit 12, hall element and MR element (magnetoresistance element) TMF-MI element, TMF-FG element, and amorphous sensor and the like can be used. Preferably, the hall element is used because it is compact, sensitive, and easy to use. And, in the sensor element unit 20, it is important to be capable of elastic deformation in response to the move of the above-mentioned elastic modulus 13; therefore, rubber elastic material of various types are used for the elastic material 13. Especially, For example, thermoplastic elastomers (TPE) suitable for plastics molding such as casting and injection molding are preferably used to make the above-mentioned sensor element unit 20.

For the above-mentioned sensor element unit 20, a type 1-1 comprising a magnet 11 and a magnetometric sensor element 12 as shown in FIGS. 2 (A) and (B), a type 1-n comprising a magnet 11 and a number of (n; two, for example) magnetometric sensor elements 12 as shown in FIGS. 3 (A) and (B), and a type n–1 a number of (n; two, for example) magnets 11 and a magnetometric sensor element 12 as shown in FIGS. 4 (A) and (B) can be used. A reference mark 12a indicates the sensitive part of the magnetometric sensor element 12, and a reference mark 11s indicates a pole face. A reference mark N indicates the gain maximum line in which the again of the strain sensor 10 becomes maximum, and sensitivity is highest in the direction of this gain maximum line N. However, the strain sensor 10 with wire resistance strain gauge and piezo-element can be also used.

The above-mentioned strain sensor 10 preferably has a built-in outgoing tool that can transmit a measured strain ε of the sidewall portion to the electronic control unit (ECU) of a vehicle controlling system equipped on a vehicle. This outgoing tool is composed of transmitting and receiving circuit, control circuit, semiconductor comprising chipped memory, and antenna. When receiving an asking electric wave from the above-mentioned electronic control unit (ECU), this is used as electric energy, and the strain output date in the memory as an answering electric wave can transmit.

Figure 5:
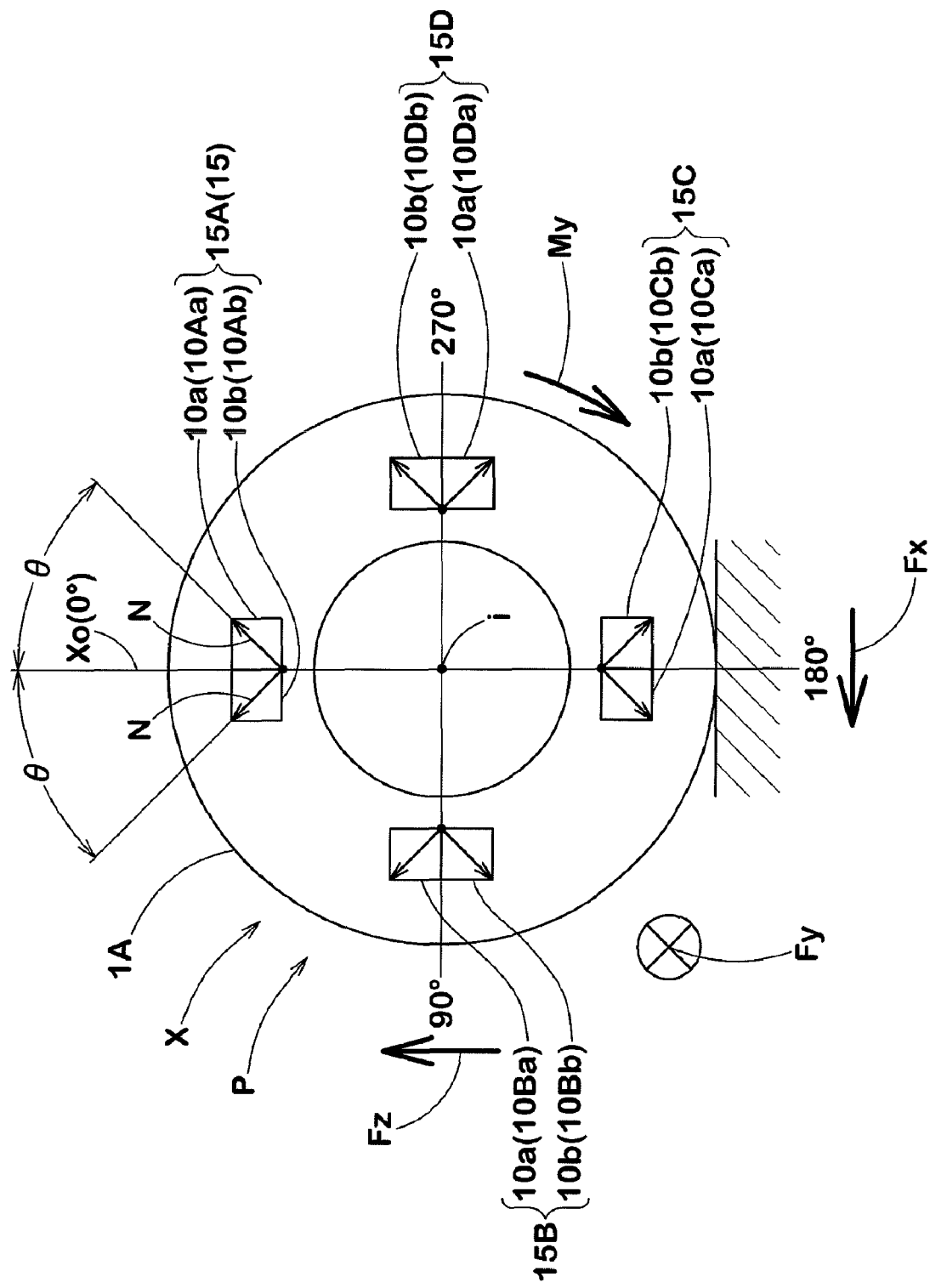
FIG. 5 is an abbreviated side view showing an arrangement of strain sensors of the pneumatic tire to be used the detection method according to the first invention.

A pneumatic tire 1A used for detection method in the first invention as shown in FIG. 5 conceptually, the above-mentioned strain sensor 10 comprises a number of the first strain sensor 10a that have the above-mentioned gain maximum line N inclining to one side of the circumferential direction of the tire (in this embodiment, to the side of rolling direction of the tire) at an angle θ of 45 deg. with respect to the tire radial direction line; and a number of the second strain sensor 10b that have the gain maximum line inclining to the other side of the circumferential direction of the tire (in this embodiment, to the opposite side of rolling direction of the tire) at an angle θ of 45 deg. with respect to the tire radial direction line.

At least four pairs of sensors, in which one of the first strain sensors 10a and one of the second strain sensors 10b are made a pair, are arranged at regular intervals on the circumference line of one circle around the axis (i). In the present embodiment, it may describe, to identify each paired sensors 15, the first to fourth paired sensors as 15A, 15B, 15C, and 15D; and to identify the first and second strain sensor 10a and 10b in respective paired sensors 15, the first and second strain sensors of the first paired sensors 15A as 10Aa and 10Ab, the first and second strain sensors of the second paired sensors 15B as 10Ba and 10Bb, the first and second strain sensors of the third paired sensors 15C as 10Ca and 10Cb, and the first and second strain sensors of the fourth paired sensors 15D as 10Da and 10Db.

The distance between the first and second strain sensor 10a and 10b of the paired sensor 15 is not more than 20 mm or 0 mm, and they are arranged in conjunction or in contact with each other.

The detection method of the first invention comprises:

(1) a strain measuring step S1 to measure the strain (ε) of the sidewall portion with each of the above-mentioned strain sensors 10 simultaneously at the rotational position P based on the tire rotational standard position X and to obtain the strain output (t) per each strain sensor 10; and (2) an acting force calculating step to calculate the force acting on tire based on the output per (t) strain sensor 10 obtained on this strain measuring step S1.

The above-mentioned tire rotational standard position X is a standard position to know the tire rotational position. As shown in FIG. 5, around the axis (i), a perpendicular line Xo extending upward from the tire axis (i) is set to zero deg. and a direction contrary to the tire rotational direction is set as a positive direction is defined. And, when a situation that a certain circumferential part of tire is at the above-mentioned position of zero deg. is defined as a tire rotational standard position X. In the present embodiment, for descriptive purposes, the situation that the mid point between the first and second strain sensors 10Aa and 10Ab of the first paired sensors 15A is at the position of zero deg. is defined as a tire rotational standard position X. And then, based on this tire rotational standard position X, a state that the tire rolls by a predetermined rolling angle is defined as a rotational position P of the tire.

In the strain measuring step S1, when the moving (rolling) tire 1 is at the above-mentioned rotational position P, the strain ε of the sidewall portion with each of the above-mentioned strain sensors 10 is measured simultaneously, and the strain output (t) per each strain sensor 10 is obtained. To conduct a vehicle controlling such as ABS break control with a high degree of accuracy, the number of the above-mentioned rotational position P provided in one revolution is plural, preferably not less than eight; and the above-mentioned strain measuring step S1 is conducted in each rotational position P. Meanwhile, the above-mentioned rotation positional P may include the tire rotational standard position X. And, the tire rotational standard position X, the tire rotational position P, and the angle of rotation of the tire can be detected in measuring the angle of rotation of the axle and the tire with an angle sensor such as the so-called resolver and encoder.

In the calculating step S2, the force acting on tire is calculated based on the output per (t) strain sensor 10 obtained on this strain measuring step S1.

It should be noted that, when generating forces acting on tire as shown in FIGS. 9 (A) to (D), the rigidity ring body (a) (tread portion 2) distortionally deforms in the direction of vector of the forces acting on tire in the sidewall portion 3 across the entire the tire circumference due to the forces acting on tire such as the back-and-forth directional force Fx, the lateral force Fy, the vertical force Fz, and the moment My about a tire axis acting on tire; and that the strain in the sidewall portion occurred by to each of the forces acting on tire have an orientation depending on the respective causative forces acting on tire, as described above.

Therefore, when acting the moment My in the tire rolling direction (in the drawing, clockwise) on the tire assuming that the tire rotational standard position X is as the rotational position P of the tire shown in FIG. 5, for example, the strain sensors 10Aa, 10Ba, 10Ca, and 10Da having the same sensing direction as the moment My (clockwise) calculate the strain in the sidewall portion by +ϵm (that is to say, strain output by +tm); and the strain sensors 10Ab, 10Bb, 10Cb, and 10Db having the opposite sensing direction to the moment My (counterclockwise) calculate the strain in the sidewall portion by −ϵm (that is to say, strain output by −tm).

Likewise, when acting the back-and-forth directional force Fx in the counter direction of the moving direction (in the drawing, counterclockwise), the strain sensors 10Ab, 10Ba, 10Bb, and 10Ca having the same sensing direction as the back-and-forth directional force Fx (counterclockwise) calculate the strain in the sidewall portion by +ϵx (that is to say, strain output by +tm); and the strain sensors 10Aa, 10Cb, 10Da, and 10Db having the opposite sensing direction to the back-and-forth directional force Fx (clockwise) calculate the strain in the sidewall portion by −ϵx (that is to say, strain output by −tm).

Likewise, when acting the upward vertical force Fz, the strain sensors 10Aa, 10Ab, 10Ba, and 10Db having the same sensing direction as the vertical direction Fz (upward) calculate the strain in the sidewall portion by +ϵz (that is to say, strain output by +tz); and the strain sensors 10Bb, 10Ca, 10Cb, and 10Da having the opposite sensing direction to vertical force Fz (downward) calculate the strain in the sidewall portion by −ϵz (that is to say, strain output by −tz).

Likewise, when acting the lateral force Fy, all the strain sensors 10Aa, 10Ab, 10Ba, 10Bb, 10Ca, 10Cb, 10Da, and 10Db calculate the strain in the sidewall portion by +ϵy (that is to say, strain output by +ty) or the strain in the sidewall portion by −ϵy (that is to say, strain output by −ty).

The above results are shown in Table 1.

TABLE 1

|  | First paired sensors | | Second paired sensors | | Third paired sensors | | Fourth paired sensors | | Summation $\Sigma t$ |
| --- | --- | --- | --- | --- | --- | --- | --- | --- | --- |
|  | 10Aa | 10Ab | 10Ba | 10Bb | 10Ca | 10Cb | 10Da | 10Db | of strain output |
| Vertical force Fz | +tz | +tz | +tz | −tz | −tz | −tz | −tz | +tz | $\Sigma tz = 0$ |
| Back-and-forth directional force Fx | −tx | +tx | +tx | +tx | +tx | −tx | −tx | −tx | $\Sigma tx = 0$ |
| Moment My | +tm | −tm | +tm | −tm | +tm | −tm | +tm | −tm | $\Sigma tm = 0$ |
| Lateral force Fy | +ty | +ty | +ty | +ty | +ty | +ty | +ty | +ty | $\Sigma ty = 8 \cdot ty$ |

As shown in Table 1, (I.) the strain output (tm) of the strain (ϵm) in the sidewall portion generated due to the above-mentioned moment My becomes zero in the summation $\Sigma tm$ of the strain output (tm) calculated with each strain sensor 10 and gets balanced out;

(II.) the strain output (tx) of the strain (ϵx) in the sidewall portion generated due to the above-mentioned back-and-forth directional force Fx becomes zero in the summation $\Sigma tx$ of the strain output (tx) calculated with each strain sensor 10 and gets balanced out;

(III.) the strain output (tz) of the strain (ϵz) in the sidewall portion generated due to the above-mentioned vertical force Fz becomes zero in the summation $\Sigma tz$ of the strain output (tz) calculated with each strain sensor 10 and gets balanced out; and (IV.) the strain output (ty) of the strain (ϵy) in the sidewall portion generated due to the above-mentioned lateral force Fy becomes 8·ty in the summation $\Sigma ty$ of the strain output (ty) calculated with each strain sensor 10.

This means as follows:

for example, when a strain (ϵ) generate in the sidewall portion in a tire due to acting a resultant force F composing a back-and-forth directional force Fx, a lateral force Fy, a vertical force Fz, and a moment My about the tire axis, this strain (ϵ) in the sidewall portion is a sum (ϵ=ϵx+ϵy+ϵz+ϵm) of a strain component (ϵx) caused by the back-and-forth directional force Fx, a strain component (ϵy) caused by the lateral force Fy, a strain component (ϵz) caused by the vertical force Fz, and a strain component (ϵm) caused by the moment My about the tire axis.

Therefore, when the strain (ϵ) in the sidewall portion obtained this resultant force F is measured with each strain sensor 10 and when the strain output (t) is calculate, the strain output (tm) of the strain (ϵm) in the sidewall portion generated due to the above-mentioned moment My gets balanced out as mentioned in the above (I);

the strain output (tx) of the strain (ϵx) in the sidewall portion generated due to the above-mentioned back-and-forth directional force Fx gets balanced out as mentioned in the above (II);

the strain output tz of the strain ϵz in the sidewall portion generated due to the above-mentioned vertical force Fz gets balanced out as mentioned in the above (III).

Therefore, as mentioned in the above (IV), the summation $\Sigma t$ of the strain output (t) calculated with each strain sensor 10 shows up only as the summation $\Sigma ty$ of the strain output (ty). In this way, when the resultant force F acts on the tire, by summing the strain output (t) of all of the strain sensors 10, only the strain output (ty) of the lateral force Fy can be extracted.

Figure 6A:
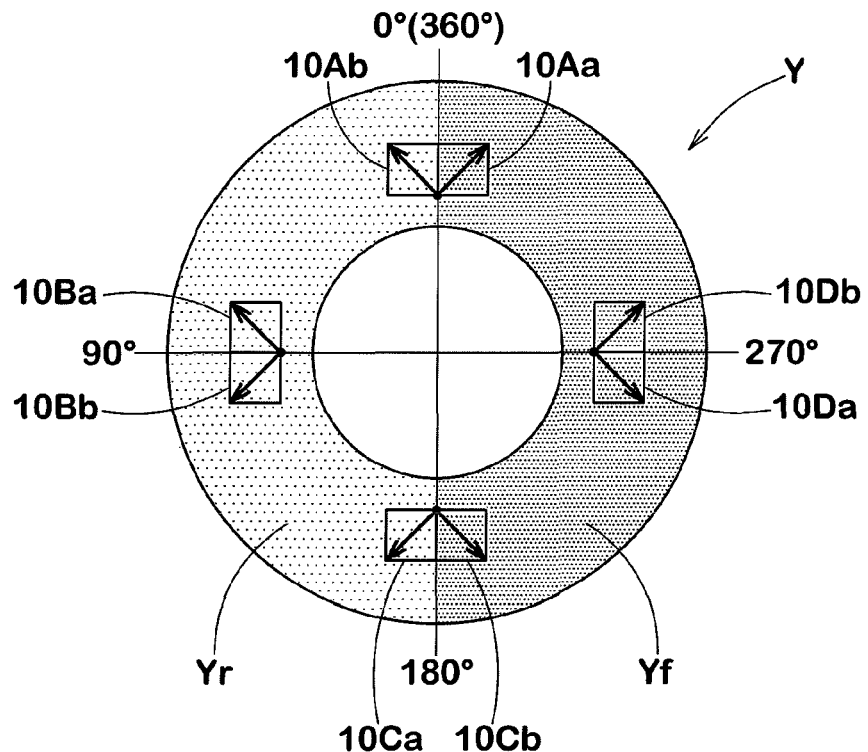
FIG. 6 (A) is a side view explaining a rear side region and a front side region of the tire rolling direction, and FIG. (B) is a side view of explaining an upper side region and a lower side region.
Figure 6B:
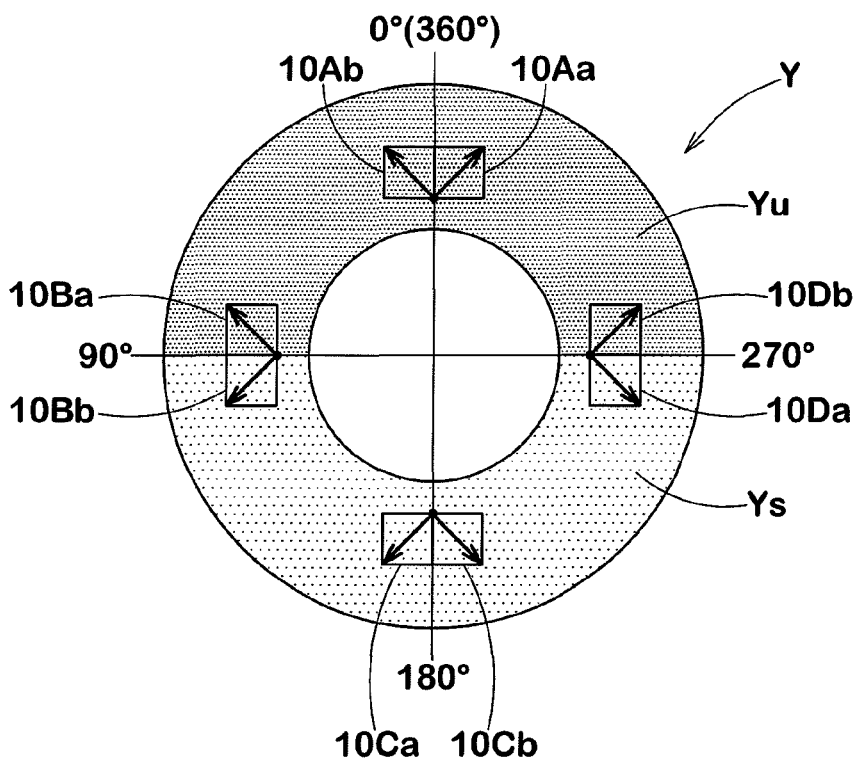

When picking out the strain output (tx) of the back-and-forth directional force Fx, as shown in FIG. 6 (A), the above-mentioned region Y is virtually divided into a rear side region Yr in the tire moving direction at a coordinate angle ranging from more than zero deg. to less than 180 deg. in said pole coordinate, and a front side region Yf in the tire moving direction at a coordinate angle ranging from more than 180 deg. to less than 360 deg.

And then, only the strain output tx of the back-and-forth directional force Fx can be extracted through calculating the difference ($\Sigma tr - \Sigma tf$) between the summation $\Sigma tr$ of the strain output (tr) of the strain sensors 10 positioned in the above-mentioned region Yr and the summation $\Sigma tf$ of the strain output (tf) of the strain sensor 10 positioned in the above-mentioned region Yf.

In the Table 2, the strain sensors 10Aa, 10Ab, 10Ba, 10Bb, 10Ca, 10Cb, 10Da, and 10Db are rearranged the order of Table 1. And, the strain sensor 10 disposed in the rear side region Yr and the strain sensor 10 disposed in the front side region Yf are distinguished.

TABLE 2

| | Rear side region Yr | | | | Front side region Yf | | | | Difference ($\Sigma tr - \Sigma tf$) of strain output |
|---|---|---|---|---|---|---|---|---|---|
| | 10Ab | 10Ba | 10Bb | 10Ca | 10Aa | 10Cb | 10Da | 10Db | |
| Vertical force Fz | +tz(tzr) | +tz(tzr) | −tz(tzr) | −tz(tzr) | +tz(tzf) | −tz(tzf) | −tz(tzf) | +tz(tzf) | $\Sigma tzr - \Sigma tzf = 0$ |
| Back-and-forth directional force Fx | +tx(txr) | +tx(txr) | +tx(txr) | +tx(txr) | −tx(txf) | −tx(txf) | −tx(txf) | −tx(txf) | $\Sigma txr - \Sigma txf = 8 \cdot tx$ |
| Moment My | −tm(tmr) | +tm(tmr) | −tm(tmr) | +tm(tmr) | +tm(tmf) | −tm(tmf) | +tm(tmf) | −tm(tmf) | $\Sigma tmr - \Sigma tmf = 0$ |
| Lateral force Fy | +ty(tyr) | +ty(tyr) | +ty(tyr) | +ty(tyr) | +ty(tyf) | +ty(tyf) | +ty(tyf) | +ty(tyf) | $\Sigma tyr - \Sigma tyf = 0$ |

As shown in Table 2, (V.) as to the strain output (tm) of the strain ($\epsilon$m) in the sidewall portion generated due to the above-mentioned moment My, through calculating the difference ($\Sigma$tmr−$\Sigma$tmf) between the summation $\Sigma$tmr of the strain output (tmr) of the strain sensors 10Ab, 10Ba, 10Bb, and 10Ca positioned in the rear side region Yr and the summation $\Sigma$tmf of the strain output (tmf) of the strain sensors 10Aa, 10Cb, 10Da, and 10Db positioned in the front side region Yf, the strain output (tm) gets balanced out as ($\Sigma$tmr−$\Sigma$tmf)=0;

(VI.) as to the strain output (tx) of the strain ($\epsilon$x) in the sidewall portion generated due to the above-mentioned back-and-forth directional force Fx, through calculating the difference ($\Sigma$txr−$\Sigma$txf) between the summation $\Sigma$txr of the strain output (txr) of the strain sensors 10Ab, 10Ba, 10Bb, and 10Ca positioned in the rear side region Yr and the summation $\Sigma$txf of the strain output (txf) of the strain sensors 10Aa, 10Cb, 10Da, and 10Db positioned in the front side region Yf, the strain output (tx) is calculated as 8·tx;

(VII.) as to the strain output (tz) of the strain ($\epsilon$z) in the sidewall portion generated due to the above-mentioned vertical force Fz, through calculating the difference ($\Sigma$tzr−$\Sigma$tzf) between the summation $\Sigma$tzr of the strain output (tzr) of the strain sensors 10Ab, 10Ba, 10Bb, and 10Ca positioned in the rear side region Yr and the summation $\Sigma$tzf of the strain output (tzf) of the strain sensors 10Aa, 10Cb, 10Da, and 10Db positioned in the front side region Yf, the strain output (tz) gets balanced out as ($\Sigma$tzr−$\Sigma$tzf)=0; and (VIII.) as to the strain output (ty) of the strain ($\epsilon$y) in the sidewall portion generated due to the above-mentioned lateral force Fy, through calculating the difference ($\Sigma$tyr−$\Sigma$tyf) between the summation $\Sigma$tyr of the strain output (tyr) of the strain sensors 10Ab, 10Ba, 10Bb, and 10Ca positioned in the rear side region Yr and the summation $\Sigma$tyf of the strain output (tyf) of the strain sensors 10Aa, 10Cb, 10Da, and 10Db positioned in the front side region Yf, the strain output (ty) gets balanced out as ($\Sigma$tyr−$\Sigma$tyf)=0.

That is to say, also even if the resultant force F acts, through calculating the difference ($\Sigma$tr−$\Sigma$tf) between the summation $\Sigma$tr of the strain output (tr) of the strain sensors 10Ab, 10Ba, 10Bb, and 10Ca positioned in the rear side region Yr and the summation $\Sigma$tf of the strain output (tf) of the strain sensors 10Aa, 10Cb, 10Da, and 10Db positioned in the front side region Yf, only the strain output (tx) of the back-and-forth directional force Fx can be extracted.

When picking out the strain output (tz) of the vertical force Fz, as shown in FIG. 6 (B), the above-mentioned region Y is virtually divided into an upper side region Yu of the tire at a coordinate angle ranging from more than 270 deg. to less than 90 deg. in the pole coordinate, and a lower region Ys of the tire at a coordinate angle ranging from more than 90 deg. to less than 270 deg.

And then, only the strain output (tz) of the vertical force Fz can be extracted through calculating the difference ($\Sigma$tu−$\Sigma$ts) between the summation $\Sigma$tu of the strain output (tu) of the strain sensors 10 positioned in the above-mentioned upper side region Yu and the summation $\Sigma$ts of the strain output (ts) of the strain sensor 10 positioned in the above-mentioned lower side region Ys.

In Table 3, the strain sensors 10Aa, 10Ab, 10Ba, 10Bb, 10Ca, 10Cb, 10Da, and 10Db are rearranged the order of Table 1. And, the strain sensors 10 disposed in the upper side region Yu and the strain sensors 10 disposed in the lower side region Ys are distinguished.

TABLE 3

| | Upper side region Yu | | | | Lower side region Ys | | | | Difference ($\Sigma tu - \Sigma ts$) of strain output |
|---|---|---|---|---|---|---|---|---|---|
| | 10Aa | 10Ab | 10Ba | 10Db | 10Bb | 10Ca | 10Cb | 10Da | |
| Vertical force Fz | +tz(tzu) | +tz(tzu) | +tz(tzu) | +tz(tzu) | −tz(tzs) | −tz(tzs) | −tz(tzs) | −tz(tzs) | $\Sigma tzu - \Sigma tzs = 8 \cdot tz$ |
| Back-and-forth directional force Fx | −tx(txu) | +tx(txu) | +tx(txu) | −tx(txu) | +tx(txs) | +tx(txs) | −tx(txs) | −tx(txs) | $\Sigma txu - \Sigma txs = 0$ |
| Moment My | +tm(tmu) | −tm(tmu) | +tm(tmu) | −tm(tmu) | −tm(tms) | +tm(tms) | −tm(tms) | +tm(tms) | $\Sigma tmu - \Sigma tms = 0$ |
| Lateral force Fy | +ty(tyu) | +ty(tyu) | +ty(tyu) | +ty(tyu) | +ty(tys) | +ty(tys) | +ty(tys) | +ty(tys) | $\Sigma tyu - \Sigma tys = 0$ |

As shown in Table 3, (IX.) as to the strain output (tm) of the strain ($\epsilon$m) in the sidewall portion generated due to the above-mentioned moment My, through calculating the difference ($\Sigma$tmu−$\Sigma$tms) between the summation $\Sigma$tmu of the strain output (tmu) of the strain sensors 10Aa, 10Ab, 10Ba, and 10Db positioned in the upper side region Yu and the summation $\Sigma$tms of the strain output (tms) of the strain sensors 10Bb, 10Ca, 10Cb, and 10Da positioned in the lower side region Ys, the strain output (tm) gets balanced out as ($\Sigma$tmu−$\Sigma$tms)=0;

(X.) as to the strain output (tx) of the strain (ϵx) in the sidewall portion generated due to the above-mentioned back-and-forth directional force Fx, through calculating the difference (Σtxu−Σtxs) between the summation Σtxu of the strain output (txu) of the strain sensors 10Aa, 10Ab, 10Ba, and 10Db positioned in the upper side region Yu and the summation Σtxs of the strain output (txs) of the strain sensors 10Bb, 10Ca, 10Cb, and 10Da positioned in the lower side region Ys, the strain output (tx) gets balanced out as (Σtxu−Σtxs)=0;

(XI.) as to the strain output (tz) of the strain (ϵz) in the sidewall portion generated due to the above-mentioned vertical force Fz, through calculating the difference (Σtzu−Σtzs) between the summation Σtzu of the strain output (tzu) of the strain sensors 10Aa, 10Ab, 10Ba, and 10Db positioned in the upper side region Yu and the summation Σtzs of the strain output (tzs) of the strain sensors 10Bb, 10Ca, 10Cb, and 10Da positioned in the lower side region Ys, the strain output (tz) is calculated as 8·tx; and (XII.) as to the strain output (ty) of the strain (ϵy) in the sidewall portion generated due to the above-mentioned lateral force Fy, through calculating the difference (Σtyu−Σtys) between the summation Σtyu of the strain output (tyu) of the strain sensors 10Aa, 10Ab, 10Ba, and 10Db positioned in the upper side region Yu and the summation Σtys of the strain output (tys) of the strain sensors 10Bb, 10Ca, 10Cb, and 10Da positioned in the lower side region Ys, the strain output (ty) gets balanced out as (Σtyu−Σtys)=0.

That is to say, also even if the resultant force F acts, through calculating the difference (Σtu−Σts) between the summation Σtu of the strain output (tu) of the strain sensors 10Aa, 10Ab, 10Ba, and 10Db positioned in the upper side region Yu and the summation Σts of the strain output (ts) of the strain sensors 10Bb, 10Ca, 10Cb, and 10Da positioned in the lower side region Ys, only the strain output (tz) of the vertical force Fz can be extracted.

When picking out the strain output (tm) of the moment My about the tire axis, through calculating the difference (Σt1−Σt2) between the summation Σt1 of the strain output (t1) of the first strain sensor 10a and the summation Σt1 of the strain output (t2) of the second strain sensor 10b, only the strain output (tm) of the moment My can also be extracted.

In the Table 4, the strain sensors 10Aa, 10Ab, 10Ba, 10Bb, 10Ca, 10Cb, 10Da, and 10Db are rearranged the order of Table 1. And, the first strain sensors 10 disposed in the upper side region Yu and the second strain sensors 10 are distinguished.

(XIII.) as to the strain output (tm) of the strain (ϵm) in the sidewall portion generated due to the above-mentioned moment My, through calculating the difference (Σtm1−Σtm2) between the summation Σtm1 of the strain output tm1 of the first strain sensors 10Aa, 10Ba, 10Ca, and 10Da and the summation Σtm2 of the strain output tm2 of the second strain sensors 10Ab, 10Bb, 10Cb, and 10Db, the strain output (tm) is calculated as 8·tx;

(XIV.) as to the strain output (tx) of the strain (ϵx) in the sidewall portion generated due to the above-mentioned back-and-forth directional force Fx, through calculating the difference (Σtx1−Σtx2) between the summation Σtx1 of the strain outputs tx1 of the first strain sensors 10Aa, 10Ba, 10Ca, and 10Da and the summation Σtx2 of the strain outputs tx2 of the second strain sensors 10Ab, 10Bb, 10Cb, and 10Db, the strain output (tz) gets balanced out as (Σtx1−Σtx2)=0;

(XV.) as to the strain output (tz) of the strain (ϵz) in the sidewall portion generated due to the above-mentioned vertical force Fz, through calculating the difference (Σtz1−Σtz2) between the summation Σtz1 of the strain outputs tz1 of the first strain sensors 10Aa, 10Ba, 10Ca, and 10Da and the summation Σtz2 of the strain outputs tz2 of the second strain sensors 10Ab, 10Bb, 10Cb, and 10Db, the strain output (tz) gets balanced out as (Σtx1−Σtx2)=0; and (XVI.) as to the strain output (ty) of the strain (ϵy) in the sidewall portion generated due to the above-mentioned lateral force Fy, through calculating the difference (Σty1−Σty2) between the summation Σty1 of the strain outputs ty1 of the first strain sensors 10Aa, 10Ba, 10Ca, and 10Da and the summation Σtys of the strain outputs (tys) of the second strain sensors 10Ab, 10Bb, 10Cb, and 10Db, the strain output (ty) gets balanced out as (Σty1−Σty2)=0.

That is to say, also even if the resultant force F acts, through calculating the difference (Σt1−Σt2) between the summation Σt1 of the strain outputs t1 of the first strain sensors 10Aa, 10Ba, 10Ca, and 10Da and the summation Σt2 of the strain outputs t2 of the second strain sensors 10Ab, 10Bb, 10Cb, and 10Db, only the strain output (tm) of the moment My about the tire axis can be extracted.

Therefore, the above-mentioned acting force calculating step S2 comprises at least one of steps of:

extracting a lateral force, wherein only the strain output (ty) of the lateral force Fy can be extracted through summing the strain output (t) of all of the strain sensors 10, as shown in the above (I.) to (IV.);

extracting a back-and-forth directional force, wherein only the strain output (tx) of the back-and-forth directional force Fx can be extracted through calculating the difference (Σtr−Σtf) between the summation Σtr of the strain

TABLE 4

| | First strain sensor | | | | Second strain sensor | | | | Difference (Σt1 − Σt2) of strain output |
| --- | --- | --- | --- | --- | --- | --- | --- | --- | --- |
| | 10Aa | 10Ba | 10Ca | 10Da | 10Ab | 10Bb | 10Cb | 10Db | |
| Vertical force Fz | +tz(tz1) | +tz(tz1) | −tz(tz1) | −tz(tz1) | +tz(tz2) | −tz(tz2) | −tz(tz2) | +tz(tz2) | Σtz1 − Σtz2 = 0 |
| Back-and-forth directional force Fx | −tx(tx1) | +tx(tx1) | +tx(tx1) | −tx(tx1) | +tx(tx2) | +tx(tx2) | −tx(tx2) | −tx(tx2) | Σtx1 − Σtx2 = 0 |
| Moment My | +tm(tm1) | +tm(tm1) | +tm(tm1) | +tm(tm1) | −tm(tm2) | −tm(tm2) | −tm(tm2) | −tm(tm2) | Σtm1 − Σtm2 = 8 · tm |
| Lateral force Fy | +ty(ty1) | +ty(ty1) | +ty(ty1) | +ty(ty1) | +ty(ty2) | +ty(ty2) | +ty(ty2) | +ty(ty2) | Σty1 − Σty2 = 0 |

As shown in Table 4, output (tr) of the strain sensors 10 positioned in the rear side region Yr and the summation Σtf of the strain output (tf) of the strain sensors 10 positioned in the front side region Yf, as shown in the above (V.) to (VIII.);

extracting a vertical force, wherein only the strain output (tz) of the vertical force Fz can be extracted through calculating the difference (Σtu−Σts) between the summation Σtu of the strain outputs (tu) of the strain sensors 10 positioned in the upper side region Yu and the summation Σts of the strain outputs (ts) of the strain sensors 10 positioned in the lower side region Ys, as shown in the above (IX.) to (XII.); and extracting a moment, wherein only the strain output (tm) of the moment My about the tire axis can be extracted through calculating the difference (Σt1−Σt2) between the summation Σt1 of the strain output (t1) of the first strain sensor 10a and the summation Σt2 of the strain output (t2) of the second strain sensor 10b, as shown in the above (XIII.) to (XVI.); and then, this helps to calculate only certain forces acting on tire with separation from other forces acting on tire.

Meanwhile, in the above-mentioned lateral force extracting step, since the summation Σt of the strain outputs (t) of all the strain sensors 10 is 8·ty, an average value Σt/J obtained by dividing the above-mentioned summation Σt by the number of sensors J extracted as the above-mentioned strain output (ty) of the lateral force Fy. Likewise, in the above-mentioned back-and-forth directional force extracting step, an average value (Σtr−Σtf)/J obtained by dividing the above-mentioned difference (Σtr−Σtf) by the number of sensors J is extracted as the above-mentioned strain output (tx) of the lateral force Fx. In the vertical force extracting step, an average value (Σtu−Σts)/J obtained by dividing the above-mentioned difference (Σtu−Σts) by the number of sensors J is extracted as the above-mentioned strain output (tz) of the vertical force Fz. And, in the moment extracting step, an average value (Σt1−Σt2)/J obtained by dividing the above-mentioned difference (Σt1−Σt2) by the number of sensors J is extracted as the above-mentioned strain output (tm) of the moment My.

In the above-mentioned acting force calculating step S2 comprises at least one of steps of:

calculating the lateral force Fy based on the strain output (ty) (=Σt/J) extracted in the above-mentioned extracting step;

calculating the back-and-forth directional force Fx based on the strain output (tx) (=(Σtr−Σtf)/J) extracted in the above-mentioned extracting step;

calculating the vertical force Fz based on the strain output (tz) (=(Σtu−Σts)/J) extracted in the above-mentioned extracting step; and calculating the moment My based on the strain output (tm) (=(Σt1−Σt2)/J) extracted in the above-mentioned extracting step.

In the above-mentioned lateral force calculating step, as shown in the following expression (2), with the relational expression between a lateral force Fy and a strain output (ty) is used, and only the strain output (ty) is a variable number. The lateral force Fy acting on the tire 1 is calculated with this expression (2) by assigning the above-mentioned average value Σt/J to the strain output (ty).

$$Fy=f1(ty) \quad (2)$$

In the above-mentioned back-and-forth directional force calculating step, as shown in the following expression (3), with the relational expression between a back-and-forth directional force Fx and a strain output (tx) is used, and only the strain output (tx) is a variable number. The back-and-forth directional force Fx acting on the tire 1 is calculated with this expression (3) by assigning the above-mentioned average value (Σtr−Σtf)/J to the strain output (tx).

$$Fx=f2(tx) \quad (3)$$

In the above-mentioned vertical force calculating step, as shown in the following expression (4), with the relational expression between a vertical force Fz and a strain output (tz) is used, and only the strain output (tz) is a variable number. The vertical force Fz acting on the tire 1 is calculated with this expression (4) by assigning the above-mentioned average value (Σtu−Σts)/J to the strain output (tz).

$$Fz=f3(tz) \quad (4)$$

In the above-mentioned moment calculating step, as shown in the following expression (5), with the relational expression between a moment My and a strain output (tm) is used, and only the strain output (tm) is a variable number. The moment My acting on the tire 1 is calculated with this expression (5) by assigning the above-mentioned average value (Σt1−Σt2)/J to the strain output (tm).

$$My=f4(tm) \quad (5)$$

Meanwhile, the above-mentioned relational expressions (2) to (5) can be obtained by preliminary tests of loading on tire. For example, regarding the relational expression (2), only the lateral force Fy is acted on the tire at the predetermined rotational position P, and this lateral force Fy is changed variably; and then, the above-mentioned average values Σt/J of the strain output at the time are measured sequentially. In this way, a relation between the lateral force Fy and the average values Σt/J at the above-mentioned rotational position P, that is to say the relational expression Fy=f1(ty), can be obtained.

With respect to the relational expression (3), only the back-and-forth directional force Fx is acted on the tire at the predetermined rotational position P, and this back-and-forth directional force Fx is changed variably; and then, the above-mentioned average values (Σtr−Σtf)/J of the strain output at the time are measured sequentially. In this way, a relation between the back-and-forth directional force Fx and the average values (Σtr−Σtf)/J at the above-mentioned rotational position P, that is to say the relational expression Fx=f2(tx), can be obtained.

As to the relational expression (4), only the vertical force Fz is acted on the tire at the predetermined rotational position P, and this vertical force Fz is changed variably; and then, the above-mentioned average values (Σtu−Σts)/J of the strain output at the time are measured sequentially. In this way, a relation between vertical force Fz and the average values (Σtu−Σts)/J at the above-mentioned rotational position P, that is to say the relational expression Fz=f3(tz), can be obtained.

With regard to the relational expression (5), only the moment My is acted on the tire at the predetermined rotational position P, and this moment My is changed variably; and then, the above-mentioned average values (Σt1−Σt2)/J of the strain output at the time are measured sequentially. In this way, a relation between moment My and the average values (Σt1−Σt2)/J at the above-mentioned rotational position P, that is to say the relational expression My=f4(tm), can be obtained.

When providing with the above-mentioned rotational positions P in a number of positions, the following three ways can be adopted. The first way is that the above-mentioned relational expressions (2) to (5) with respect to each rotational position P are preliminarily obtained through the above-mentioned tests of loading on tire. Then, through using the relational expressions (2) to (5) regarding each rotational position P, the acting force calculating step is conducted at each of the rotational positions P.

The second way is that one rotational position P is arbitrarily chosen among a number of rotational positions P.

Concerning the chosen rotational position P (a standard rotational position P0), the relational expressions (2) to (5) are preliminarily obtained through the tests of loading on tire. And, the acting force calculating step is conducted with the above-mentioned relational expressions (2) to (5) regarding this standard rotational position P0. Regarding the rests of unchosen rotational positions P, the acting force calculating step is conducted through using substitutionally the relational expressions (2) to (5) of the above-mentioned standard rotational position P0.

In this second way, it is preferable to attach more than eight pairs of the paired sensors 15 in the circumferential direction at regular intervals to improve the accuracy of the calculation.

Figure 7:
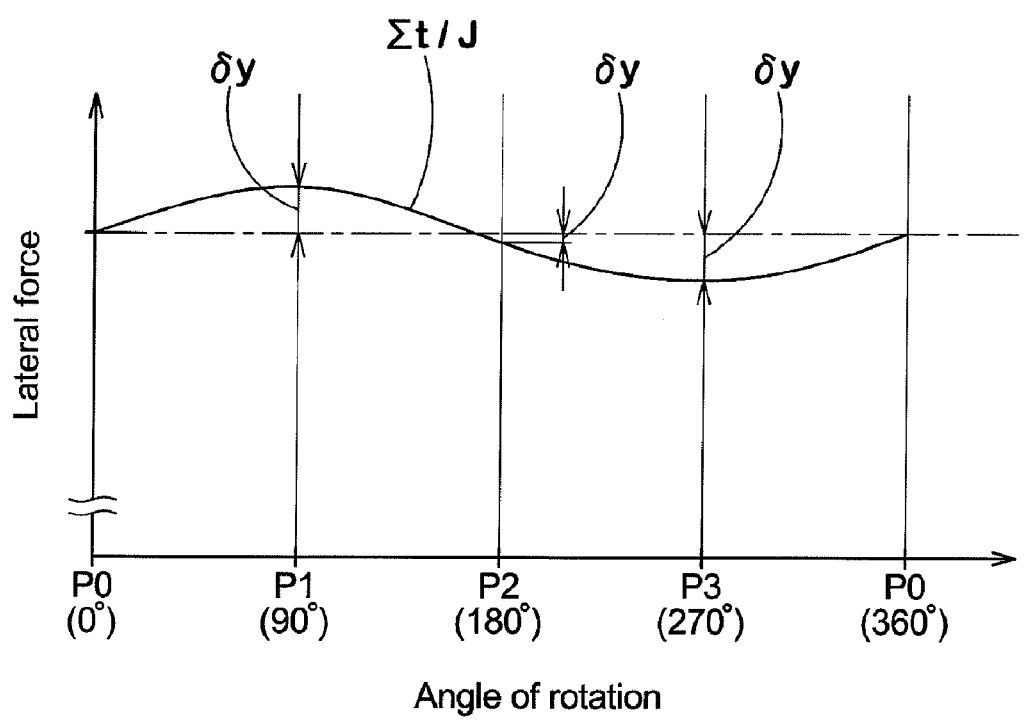
FIG. 7 is a graph showing an example of a correcting operation of an acting force calculating step.

Also, to improve the accuracy of the calculation in the above-mentioned second way, with regard to the rests of unchosen rotational positions P, it will be also preferable to correct the average values of the strain outputs depending on the rotational positions P thereof and to assign these corrected average values to the above-mentioned substitute relational expressions (2) to (5). Specifically, as shown in FIG. 7 representing a case of the lateral force Fy, in the preliminary tire loading test under the state that only a certain lateral force Fy acts on the tire, the changes of the above-mentioned average values $\Sigma t/J$ of the strain outputs with respect to the angle of rotation are measured while rotating the tire. And, setting the rotational position P0 used for obtaining the above-mentioned relational expressions (2) to (5) as a standard, the dispersions of the above-mentioned averages values $\Sigma t/J$ are stored as correction values ($\delta y$) depending on angles of rotation from the above-mentioned standard angle of rotation. And then, on rotational positions P1 to P3 except the standard rotational position P0, the average values $\Sigma t/J$ measured at each of the rotational positions P1 to P3 are corrected by the correction value ($\delta y$) that depends on the above-mentioned angle of rotation. And then, the corrected average values $\Sigma t/J$ are assigned to the above-mentioned substitute relational expressions (2) to (5).

Meanwhile, it is the same for the back-and-forth directional force Fx, the vertical force Fz, and the moment My. Under the state that a certain force of the back-and-forth directional force Fx, vertical force Fz, or moment My acts on the tire, the changes of the above-mentioned average values ($\Sigma tr - \Sigma tf)/J$, ($\Sigma tu - \Sigma ts)/J$, or ($\Sigma t1 - \Sigma t2)/J$ of the strain outputs with respect to the angle of rotation are measured while rotating the tire. And, setting the rotational position P0 used for obtaining the above-mentioned relational expressions (2) to (5) as a standard, the dispersions of the respective averages values are stored as correction values ($\delta x$, $\delta z$, $\delta m$) depending on angles of rotation from the above-mentioned standard angle of rotation. And then, on rotational positions P1 to P3 except the standard rotational position P0, the average values measured at each of the rotational positions P1 to P3 are corrected by the correction value ($\delta x$, $\delta z$, $\delta m$) that depends on the above-mentioned angle of rotation.

Figure 8:
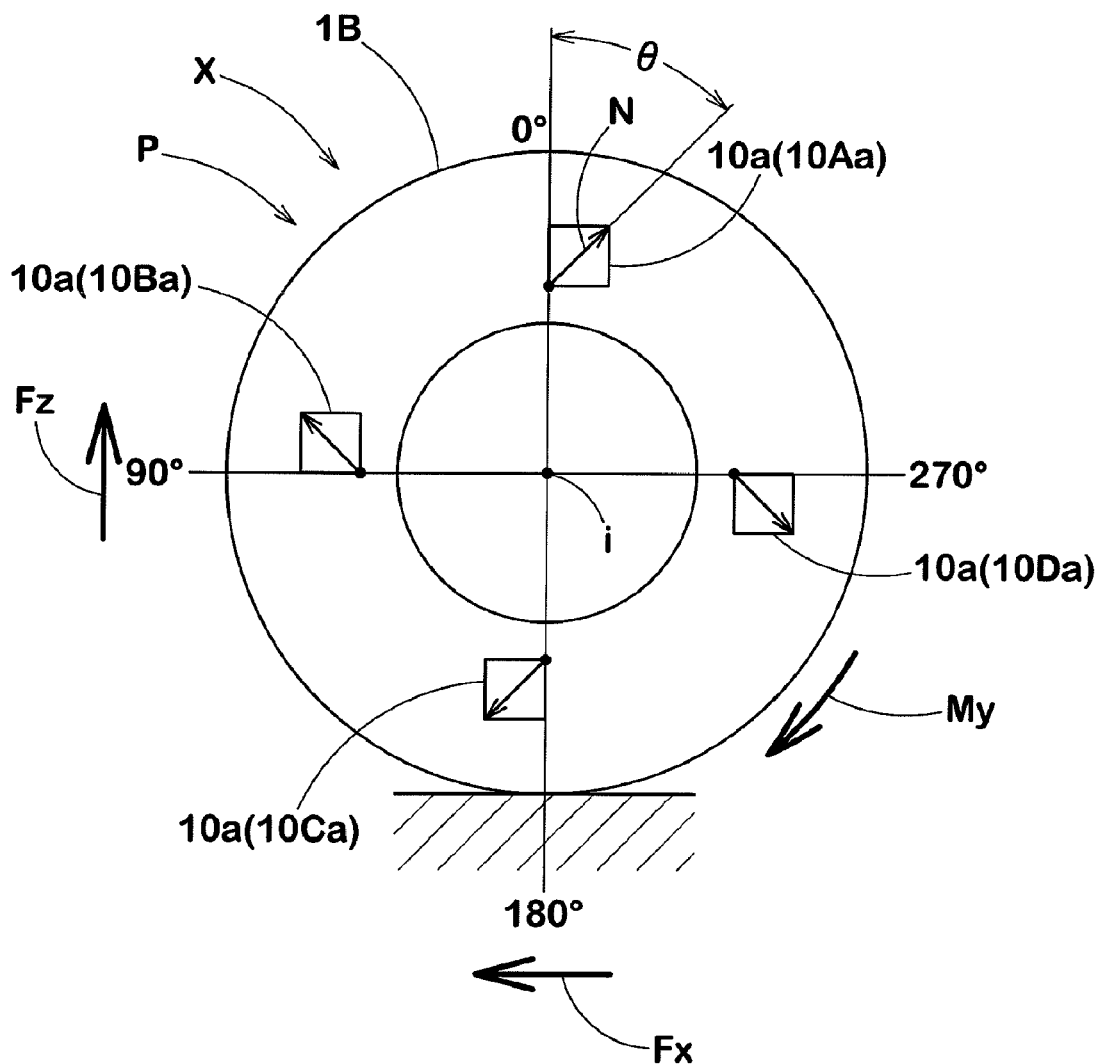
FIG. 8 is an abbreviated side view showing an arrangement of strain sensors of the pneumatic tire to be used the detection method according to the second invention.
Figure 9A:
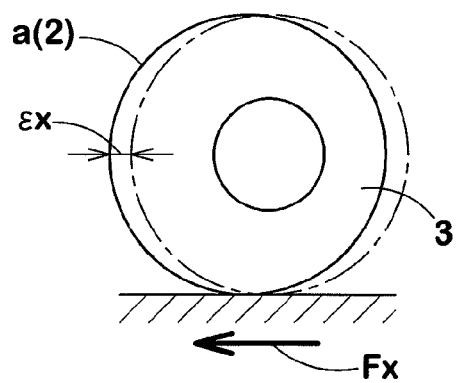
FIGS. 9 (A) to (D) are drawings conceptually explaining tire deformations at the time of acting back-and-forth directional force, lateral force, vertical force, and moment about a tire axis.
Figure 9B:
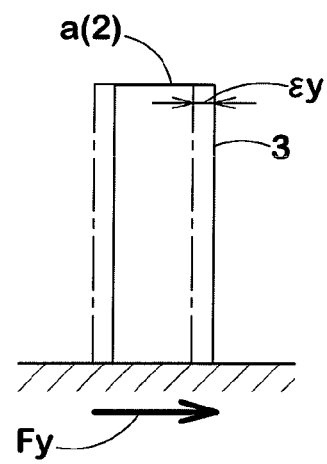
Figure 9C:
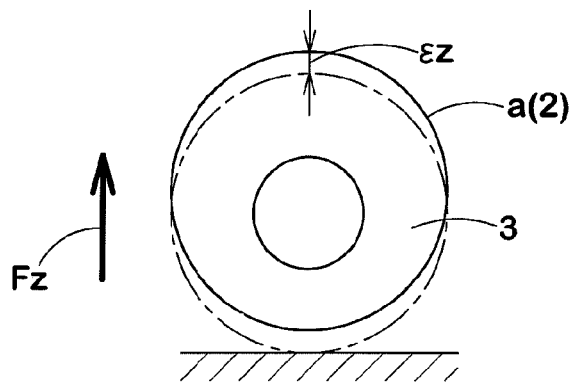
Figure 9D:
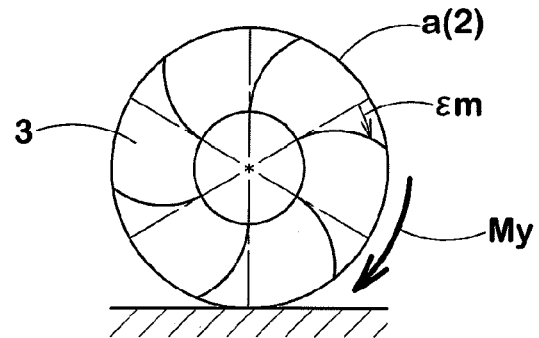

Now, the pneumatic tire 1B used in the detection method for forces acting on tire according to the second invention will be explained. The pneumatic tire 1B as shown in FIG. 8 conceptually, the above-mentioned strain sensors 10 comprise a number of first strain sensors 10$a$ that have the above-mentioned gain maximum line N inclines to one side of the circumferential direction of the tire (in the present embodiment, to the side of rolling di reaction of the tire) at an angle $\theta$ of 45 deg. with respect to the tire radial direction line. And, at least four and an even number of the above-mentioned sensors 10 (the first strain sensors 10$a$), in which the first strain sensors are arranged at regular intervals on the circumference line of one circle around the axis. This makes to detect at least one of the acting forces on tire among the back-and-forth directional force Fx, vertical force Fz, and moment My. However, in the detecting method according to the second invention, the lateral force Fy is not detected. The pneumatic tire 1B has the same construction as the above-mentioned pneumatic tire 1A other than not using any second strain sensors 10$b$.

The detection method of the above-mentioned second invention comprises:
(1) a strain measuring step S1 to measure the strain ($\epsilon$) of the sidewall portion with each of the above-mentioned strain sensors 10 simultaneously at the rotational position P based on the tire rotational standard position X and to obtain the strain output (t) per strain sensor 10; and
(2) an acting force calculating step S2 to calculate the force acting on tire based on the output (t) per strain sensor 10 obtained on this strain measuring step S1.

In the pneumatic tire 1B, the strain sensors 10 are comprised of only the strain sensors 10$a$. Therefore, as shown in following Table 5,
(I.) the strain output (tm) of the strain ($\epsilon$m) in the sidewall portion generated due to the above-mentioned moment My becomes 4·tm in the summation $\Sigma$tm of the strain outputs (tm) calculated with each strain sensor 10;
(II.) the strain output (tx) of the strain ($\epsilon$x) in the sidewall portion generated due to the above-mentioned back-and-forth directional force Fx becomes zero in the summation $\Sigma$tx of the strain outputs (tx) calculated with each strain sensor 10 and gets balanced out; and
(III.) the strain output (tz) of the strain ($\epsilon$z) in the sidewall portion generated due to the above-mentioned vertical force Fz becomes zero in the summation $\Sigma$tz of the strain outputs (tz) calculated with each strain sensor 10 and gets balanced out.

That is to say, when the resultant force F acts on the tire, through summing the strain output (t) of all of the strain sensors 10, only the moment My can be extracted.

In Table 6, the strain sensors 10Aa, 10Ba, 10Ca, and 10Da are rearranged the order of Table 5. And, the strain sensor 10 disposed in the rear side region Yr and the strain sensor 10 disposed in the front side region Yf are distinguished. As shown in Table 6,
(V.) as to the strain output (tm) of the strain ($\epsilon$m) in the sidewall portion generated due to the above-mentioned moment My, through calculating the difference ($\Sigma$tmr–$\Sigma$tmf) between the summation $\Sigma$tmr of the strain outputs (tmr) of the strain sensors 10Ba and 10Ca positioned in the rear side region Yr and the summation $\Sigma$tmf of the strain outputs (tmf) of the strain sensors 10Aa and 10Da positioned in the front side region Yf, the strain output (tm) gets balanced out as ($\Sigma$tmr–$\Sigma$tmf)=0;
(VI.) as to the strain output (tx) of the strain ($\epsilon$x) in the sidewall portion generated due to the above-mentioned back-and-forth directional force Fx, through calculating the difference ($\Sigma$txr–$\Sigma$txf) between the summation $\Sigma$txr of the strain outputs (txr) of the strain sensors 10Ba and 10Ca positioned in the rear side region Yr and the summation $\Sigma$txf of the strain outputs (txf) of the strain sensors 10Aa and 10Da positioned in the front side region Yf, the strain output tx is calculated as 4·tx;
(VII.) as to the strain output (tz) of the strain ($\epsilon$z) in the sidewall portion generated due to the above-mentioned vertical force Fz, through calculating the difference ($\Sigma$tzr–$\Sigma$tzf) between the summation $\Sigma$tzr of the strain outputs (tzr) of the strain sensors 10Ba and 10Ca positioned in the rear side region Yr and the summation $\Sigma$tzf of the strain outputs (tzf) of the strain sensors 10Aa and 10Da positioned in the front side region Yf, the strain output tz gets balanced out as ($\Sigma$tzr−$\Sigma$tzf)=0; and That is to say, also even if the resultant force F acts, through calculating the difference ($\Sigma$tr−$\Sigma$tf) between the summation $\Sigma$tr of the strain outputs (tr) of the strain sensors 10 positioned in the rear side region Yr and the summation $\Sigma$tf of the strain outputs (tf) of the strain sensors 10Aa, 10Cb, 10Da, and 10Db positioned in the front side region Yf, only the strain output (tx) of the back-and-forth directional force Fx can be extracted.

The strain sensors 10Aa, 10Ba, 10Ca, and 10Da are rearranged the order of Table 5. And, the strain sensors 10 disposed in the upper side region Yu and the strain sensors 10 disposed in the lower side region Ys are distinguished. AS shown in Table 7, (IX.) as to the strain output (tm) of the strain ($\epsilon$m) in the sidewall portion generated due to the above-mentioned moment My, through calculating the difference ($\Sigma$tmu−$\Sigma$tms) between the summation $\Sigma$tmu of the strain outputs (tmu) of the strain sensors 10Aa and 10Ba positioned in the upper side region Yu and the summation $\Sigma$tms of the strain outputs (tms) of the strain sensors 10Ca and 10Da positioned in the lower side region Ys, the strain output (tm) gets balanced out as ($\Sigma$tmu−$\Sigma$tms)=0;

(X.) regarding the strain output (tx) of the strain ($\epsilon$x) in the sidewall portion generated due to the above-mentioned back-and-forth directional force Fx, through calculating the difference ($\Sigma$txu−$\Sigma$txs) between the summation $\Sigma$txu of the strain outputs (txu) of the strain sensors 10Aa and 10Ba positioned in the upper side region Yu and the summation $\Sigma$txs of the strain outputs (txs) of the strain sensors 10Ca and 10Da positioned in the lower side region Ys, the strain output (tz) gets balanced out as ($\Sigma$txu−$\Sigma$txs)=0; and (XI.) with respect to the strain output (tz) of the strain ($\epsilon$z) in the sidewall portion generated due to the above-mentioned vertical force Fz, through calculating the difference ($\Sigma$tzu−$\Sigma$tzs) between the summation $\Sigma$tzu of the strain outputs (tzu) of the strain sensors 10Aa and 10Ba positioned in the upper side region Yu and the summation $\Sigma$tzs of the strain outputs (tzs) of the strain sensors 10Ca and 10Da positioned in the lower side region Ys, the strain output (tz) is calculated as 4·tx.

That is to say, also even if the resultant force F acts, through calculating the difference ($\Sigma$tu−$\Sigma$ts) between the summation $\Sigma$tu of the strain outputs (tu) of the strain sensors 10 positioned in the upper side region Yu and the summation $\Sigma$ts of the strain outputs (ts) of the strain sensors 10 positioned in the lower side region Ys, only the strain output (tz) of the vertical force Fz can be extracted.

TABLE 5

|  | 10Aa | 10Ba | 10Ca | 10Da | Summation $\Sigma$t of strain output |
|---|---|---|---|---|---|
| Vertical force Fz | +tz | +tz | −tz | −tz | $\Sigma$tz = 0 |
| Back-and-forth directional force Fx | −tx | +tx | +tx | −tx | $\Sigma$tx = 0 |
| Moment My | +tm | +tm | +tm | +tm | $\Sigma$tm = 4·ttm |

TABLE 6

|  | Rear side region Yr | | Front side region Yf | | Difference ($\Sigma$tr − $\Sigma$tf) of strain output |
|---|---|---|---|---|---|
|  | 10Ba | 10Ca | 10Aa | 10Da |  |
| Vertical force Fz | +tz(tzr) | −tz(tzr) | +tz(tzf) | −tz(tzf) | $\Sigma$tzr − $\Sigma$tzf = 0 |
| Back-and-forth directional force Fx | +tx(txr) | +tx(txr) | −tx(txf) | −tx(txf) | $\Sigma$txr − $\Sigma$txf = 4·tx |
| Moment My | +tm(tmr) | +tm(tmr) | +tm(tmf) | +tm(tmf) | $\Sigma$tmr − $\Sigma$tmf = 0 |

TABLE 7

|  | Upper side region Yu | | Lower side region Ys | | Difference ($\Sigma$tu − $\Sigma$ts) of strain output |
|---|---|---|---|---|---|
|  | 10Aa | 10Ba | 10Ca | 10Da |  |
| Vertical force Fz | +tz(tzu) | +tz(tzu) | −tz(tzs) | −tz(tzs) | $\Sigma$tzu − $\Sigma$tzs = 4·tz |
| Back-and-forth directional force Fx | −tx(txu) | +tx(txu) | +tx(txs) | −tx(txs) | $\Sigma$txu − $\Sigma$txs = 0 |
| Moment My | +tm(tmu) | +tm(tmu) | +tm(tms) | +tm(tms) | $\Sigma$tmu − $\Sigma$tms = 0 |

Therefore, the above-mentioned acting force calculating step S2 in the detection method according to the second invention comprises at least one of steps of:

extracting a moment, wherein only the strain output (tm) of the moment My can be extracted through summing the strain outputs (t) of all of the strain sensors 10, as shown in the above (I.) to (III.);

extracting a back-and-forth directional force, wherein only the strain output (tx) of the back-and-forth directional force Fx can be extracted through calculating the difference ($\Sigma$tr−$\Sigma$tf) between the summation $\Sigma$tr of the strain outputs (tr) of the strain sensors 10 positioned in the rear side region Yr and the summation $\Sigma$tf of the strain outputs (tf) of the strain sensors 10 positioned in the front side region Yf, as shown in the above (V.) to (VII.); and extracting a vertical force, wherein only the strain output (tz) of the vertical force Fz can also be extracted through calculating the difference ($\Sigma$tu−$\Sigma$ts) between the summation $\Sigma$tu of the strain outputs (tu) of the strain sensors 10 positioned in the upper side region Yu and the summation $\Sigma$ts of the strain outputs (ts) of the strain sensors 10 positioned in the lower side region Ys, as shown in the above (IX.) to (XI.); and then,
this helps to calculate only certain forces acting on tire with separation from other forces acting on tire.

Meanwhile, in the above-mentioned moment extracting step, since the summation Σt of the strain outputs (t) of all the strain sensors 10 is 4·ty, an average value Σt/J is obtained by dividing summation Σt by the number of sensors J is extracted as the above-mentioned strain output (tm) of the moment My. Likewise, in the above-mentioned back-and-forth directional force extracting step, an average value (Σtr−Σtf)/J is obtained by dividing the difference (Σtr−Σtf) by the number of sensors J is extracted as the above-mentioned strain output (tx) of the lateral force Fx. In the vertical force extracting step, an average value (Σtu−Σts)/J is obtained by dividing the difference (Σtu−Σts) by the number of sensors J is extracted as the above-mentioned strain output (tz) of the vertical force Fz.

In the above-mentioned acting force calculating step S2 in the detection method according to the second invention comprises at least one of steps of:
  calculating the moment My based on the strain output (tm) (=Σt/J) extracted in the moment extracting step;
  calculating the back-and-forth directional force Fx based on the strain output (tx) (=(Σtr−Σtf)/J) extracted in the back-and-forth directional force extracting step; and
  calculating the vertical force Fz based on the strain output (tz) (=(Σtu−Σts)/J) extracted in the vertical force extracting step.

These calculating steps are the same as the calculating steps in the detection method according to the first invention. For example, in the above-mentioned moment calculating step, as shown in the following expression (6), with the relational expression between a moment My and a strain output (tm) is used, and only the strain output (tm) is a variable number. The moment My acting on the tire 1 is calculated with this expression (6) by assigning the above-mentioned average value Σt/J to the strain output (tm).

$$Fy = f5(tm) \quad (6)$$

In the above-mentioned back-and-forth directional force calculating step, as shown in the following expression (7), with the relational expression between a back-and-forth directional force Fx and a strain output (tx) is used, and only the strain output (tx) is a variable number. The back-and-forth directional force Fx acting on the tire 1 is calculated with this expression (7) by assigning the above-mentioned average value (Σtr−Σtf)/J to the strain output (tx).

$$Fx = f6(tx) \quad (7)$$

In the above-mentioned vertical force calculating step, as shown in the following expression (8), with the relational expression f7(tz) between a vertical force Fz and a strain output (tz) is used, and only the strain output (tz) is a variable number. The vertical force Fz acting on the tire 1 is calculated with this expression (8) by assigning the above-mentioned average value (Σtu−Σts)/J to the strain output (tz).

$$Fz = f7(tz) \quad (8)$$

The above-mentioned relational expressions (6) to (8) being the same as the expressions in the detection method according to the first invention can be obtained by preliminary tests of loading on tire.

A case to be provided with the above-mentioned rotational positions P in a number of positions is the same as the case in the detection method according to the first invention, and the relational expressions (6) to (8) with respect to each rotational position P are preliminarily obtained through the above-mentioned tests of loading on tire. Then, through using the relational expressions (6) to (8) regarding each rotational position P, the acting force calculating step is conducted at each of the rotational positions P.

Alternatively, concerning the one rotational position P chosen among a number of rotational positions P (the standard rotational position P0), the relational expressions (6) to (8) are preliminarily obtained through the tests of loading on tire. Regarding the rests of unchosen rotational positions P, the acting force calculating step is conducted through using substitutionally the relational expression (6) to (8) of the above-mentioned standard rotational position P0.

in this second way, it is preferable to attaching more than eight strain sensors 10 in the circumferential direction at regular intervals to improve the accuracy of the calculation. Also, to improve the accuracy of the calculation in another way, setting the rotational position P0 used for obtaining the above-mentioned relational expressions (6) to (8) as a standard, the dispersion of the above-mentioned averages values Σt/J are stored as correction values (δm, δx, δz) depending on angles of rotation from the above-mentioned standard angle of rotation. And then, on rotational positions P except the standard rotational position P0, the measured average values Σt/3 are corrected by the correction values (δm, δx, δz) that depends on the above-mentioned angle of rotation, respectively. And then, the corrected average values are assigned to the above-mentioned substitute relational expressions (6) to (8). This also can allow improving the accuracy of the calculation.

While description has been made of the preferable embodiments of the present inventions, the illustrated embodiments should not be construed as to limit the scope of the present invention; various modifications are possible.

The invention claimed is:

1. A detection method for at least one of acting forces on a tire among a back-and-forth directional force, a lateral force, a vertical force, and a moment about a tire axis, to detect by strain outputs of strain sensors, which are attached on the tire and measure the strains of a sidewall portion, wherein
  said strain sensors comprise:
    first strain sensors that have the gain maximum line, in which the gain thereof becomes max, inclining to one side of the circumferential direction of the tire at an angle of 45 deg. with respect to the tire radial direction line,
    second strain sensors that have the gain maximum line inclining to the other side of the circumferential direction of the tire at an angle of 45 deg. with respect to the tire radial direction line and
    at least four pairs of sensors, in which one of said first strain sensors and one of said second strain sensors are made a pair, arranged at regular intervals on the circumference line of one circle around the axis of the tire in the region of the sidewall portion of tire; and
  said method comprises:
    a strain measuring step to measure the strain of the sidewall portion with each of said strain sensors simultaneously on the rotational position P based on the tire rotational standard position X and to obtain the strain output per strain sensor, and
    an acting force calculating step to calculate said force acting on tire based on the strain output per strain sensor obtained on the strain measuring step; and
      wherein around the tire axis, polar coordinates that a perpendicular line extending upward from the tire axis is set to zero deg. and that a direction contrary to the tire rotational direction is set as a positive direction are defined; and said acting force calculating step is a step to calculate the back-and-forth directional force at said tire rotational position P based on a difference (Σtr−Σtf) between the summation Σtr of the strain outputs (tr) of the strain sensors positioned in a rear side region Yr in the tire rolling direction at a coordinate angle ranging from more than zero deg. to less than 180 deg. in said pole coordinate and the summation Σtf of the strain outputs (tf) of the strain sensors positioned in a front side region Yf in the tire rolling direction at a coordinate angle ranging from more than 180 deg. to less than 360 deg.

2. A detection method for at least one of acting forces on a tire among a back-and-forth directional force, a lateral force, a vertical force, and a moment about a tire axis, to detect by strain outputs of strain sensors, which are attached on the tire and measure the strains of a sidewall portion, wherein
said strain sensors comprise:
first strain sensors that have the gain maximum line, in which the gain thereof becomes max, inclining to one side of the circumferential direction of the tire at an angle of 45 deg. with respect to the tire radial direction line,
second strain sensors that have the gain maximum line inclining to the other side of the circumferential direction of the tire at an angle of 45 deg. with respect to the tire radial direction line, and
at least four pairs of sensors, in which one of said first strain sensors and one of said second strain sensors are made a pair, arranged at regular intervals on the circumference line of one circle around the axis of the tire in the region of the sidewall portion of tire; and
said method comprises:
a strain measuring step to measure the strain of the sidewall portion with each of said strain sensors simultaneously on the rotational position P based on the tire rotational standard position X and to obtain the strain output per strain sensor, and
an acting force calculating step to calculate said force acting on tire based on the strain output per strain sensor obtained on the strain measuring step; and
wherein
around the tire axis, polar coordinates that a perpendicular line extending upward from the tire axis is set to zero deg. and that a direction contrary to the tire rotational direction is set as a positive direction are defined; and
said acting force calculating step is a step to calculate the vertical force at said tire rotational position P based on a difference (Σtu−Σts) between the summation Σtu of strain outputs (tu) of the strain sensors positioned in a upper side region Yu in the tire rolling direction at a coordinate angle ranging from more than 270 deg. to less than 90 deg. in said pole coordinate and the summation Σts of strain outputs (ts) of the strain sensors positioned in a lower side region Ys in the tire rolling direction at a coordinate angle ranging from more than 90 deg. to less than 270 deg.

3. The detection method for force acting on tire according to claim 1, characterized in that said acting force calculating step is a step to calculate the moment about a tire axis based on the difference (Σt1−Σt2) between the summation Σt1 of the strain outputs of first strain sensors (t1) and the summation Σt2 of the strain outputs of second strain sensors (t2).

4. The detection method for force acting on tire according to claim 1, characterized in that said acting force calculating step is a step to calculate the lateral force basing on the summation Σt of the strain outputs (t) of all strain sensors.

5. A detection method for at least one of acting forces on tire among the back-and-forth directional force, the vertical force, and the moment about a tire axis acting on the tire by the strain outputs of the strain sensors attached on the tire and measuring the strains of a sidewall portion, wherein
said strain sensors comprise
only a number of first strain sensors that have the gain maximum line, in which the gain thereof becomes max, inclining to one side of the circumferential direction of the tire at an angle of 45 deg. with respect to the tire radial direction line, and
at least four and an even number of sensors, in which said first strain sensors are arranged at regular intervals on the circumference line of one circle around the axis of the tire in the region of the sidewall portion of tire; and
said method comprises:
a strain measuring step to measure the strain of the sidewall portion with each of said strain sensors simultaneously on the rotational position P based on the tire rotational standard position X and to obtain the strain output per strain sensor, and
an acting force calculating step to calculate said forces acting on tire based on the strain outputs per strain sensor obtained on this strain measuring step; and
wherein around the tire axis, polar coordinates that a perpendicular line extending upward from the tire axis is set to zero deg. and that a direction contrary to the tire rotational direction is set as a positive direction are defined, and
said acting force calculating step is a step to calculate the back-and-forth directional force at the tire rotational position P based on a difference (Σtr−Σtf) between the summation Σtr of the strain outputs (tr) of the strain sensors positioned in a rear side region Yr in the tire rolling direction at a coordinate angle ranging from more than zero deg. to less than 180 deg. in said pole coordinate and the summation Σtf of the strain outputs (tf) of the strain sensors positioned in a front side region Yf in the tire rolling direction at a coordinate angle ranging from more than 180 deg. to less than 360 deg.

6. The detection method for force acting on tire according to claim 5, characterized in that
around the tire axis, polar coordinates that a perpendicular line extending upward from the tire axis is set to zero deg. and that a direction contrary to the tire rotational direction is set as a positive direction is defined; and
said acting force calculating step is a step to calculate the vertical force at the tire rotational position P based on a difference (Σtu−Σts) between the summation Σtu of the strain outputs (tu) of the strain sensors positioned in a upper side region Yu in the tire rolling direction at a coordinate angle ranging from more than 270 deg. to less than 90 deg. in said pole coordinate and the summation Σts of the strain output (ts) of the strain sensors positioned in a lower side region Ys in the tire rolling direction at a coordinate angle ranging from more than 90 deg. to less than 270 deg.

7. The detection method for force acting on tire according to claim 5, characterized in that said acting force calculating step is a step to calculate the moment about the tire axis based on the summation Σt of the strain output (t) of all strain sensors.

* * * * *